(12) United States Patent
Jing et al.

(10) Patent No.: US 11,201,401 B2
(45) Date of Patent: Dec. 14, 2021

(54) CURRENT SURGE PROTECTION CIRCUITS FOR BASE STATION ANTENNAS HAVING REMOTE ELECTRONIC TILT CAPABILITY AND RELATED METHODS

(71) Applicant: CommScope Technologies LL, Hickory, NC (US)

(72) Inventors: Wencai George Jing, Sydney (AU); Dale R. Moore, Murphy, TX (US); Sammit Patel, Dallas, TX (US)

(73) Assignee: COMMSCOPE TECHNOLOGIES LLC, Hickory, NC (US)

( * ) Notice: Subject to any disclaimer, the term of this patent is extended or adjusted under 35 U.S.C. 154(b) by 756 days.

(21) Appl. No.: 15/778,286

(22) PCT Filed: Mar. 15, 2018

(86) PCT No.: PCT/US2018/022607
§ 371 (c)(1),
(2) Date: May 23, 2018

(87) PCT Pub. No.: WO2018/170246
PCT Pub. Date: Sep. 20, 2018

(65) Prior Publication Data
US 2021/0175622 A1    Jun. 10, 2021

Related U.S. Application Data

(60) Provisional application No. 62/472,978, filed on Mar. 17, 2017.

(51) Int. Cl.
*H01Q 3/32* (2006.01)
*H02H 9/02* (2006.01)
(Continued)

(52) U.S. Cl.
CPC ............... *H01Q 3/32* (2013.01); *H02H 9/02* (2013.01); *H02P 7/04* (2016.02); *H02P 7/06* (2013.01); *H02P 27/08* (2013.01); *H01Q 1/246* (2013.01)

(58) Field of Classification Search
None
See application file for complete search history.

(56) References Cited

U.S. PATENT DOCUMENTS 6,278,200 B1 * 8/2001 Daniel ................. H02J 3/0073
 307/31
8,514,267 B2 8/2013 Underwood et al.
(Continued)

FOREIGN PATENT DOCUMENTS

CN 201282438 Y 7/2009
CN 201378732 Y 1/2010
(Continued)

OTHER PUBLICATIONS

PCT Notification Concerning Transmittal of International Preliminary Report on Patentability, dated Sep. 26, 2019, for corresponding PCT International Application No. PCT/US2018/022607 (9 pages).
(Continued)

*Primary Examiner* — Bentsu Ro
(74) *Attorney, Agent, or Firm* — Myers Bigel, P.A.

(57) ABSTRACT

A system includes a remote electronic tilt phase shifter module, a motor, a mechanical linkage that connects the motor to the remote electronic tilt phase shifter module, a current management circuit that generates a motor control signal responsive to a current control signal, and a driver circuit that is configured to selectively connect the motor to a power supply in response to the motor control signal.

20 Claims, 5 Drawing Sheets

(51) Int. Cl.
*H02P 27/08* (2006.01)
*H02P 7/03* (2016.01)
*H02P 7/06* (2006.01)
*H01Q 1/24* (2006.01)

(56) References Cited

U.S. PATENT DOCUMENTS

| | | | |
|---|---|---|---|
| 9,306,278 | B2 | 4/2016 | Lever et al. |
| 2002/0097183 | A1 | 7/2002 | Weinbrenner |
| 2006/0050910 | A1* | 3/2006 | Danielsen ............. H02J 7/0063 381/312 |
| 2006/0269082 | A1* | 11/2006 | Danielsen ............. H02J 7/0063 381/107 |
| 2007/0171106 | A1* | 7/2007 | Bingel ...................... G06F 1/30 341/120 |
| 2008/0179954 | A1* | 7/2008 | Nguyen .............. H03F 3/45179 307/44 |
| 2009/0128433 | A1 | 5/2009 | Lawlor et al. |
| 2009/0135074 | A1 | 5/2009 | Yang et al. |
| 2010/0201591 | A1 | 8/2010 | Girard |
| 2011/0267231 | A1 | 11/2011 | Le |
| 2013/0049622 | A1* | 2/2013 | Angeles ................. H05B 45/14 315/224 |
| 2013/0120202 | A1 | 5/2013 | Lever |
| 2016/0211576 | A1 | 7/2016 | Vassilakis |

FOREIGN PATENT DOCUMENTS

| | | |
|---|---|---|
| CN | 202346635 U | 7/2012 |
| CN | 204068199 U | 12/2014 |
| CN | 104641509 A | 5/2015 |
| EP | 3101729 A1 | 12/2016 |

OTHER PUBLICATIONS

International Search Report and Written Opinion of the International Searching Authority, International Application No. PCT/US2016/022607, dated Jun. 6, 2018, 11 pages.
Chinese Office Action corresponding to CN 201880018638.4; dated Sep. 3, 2020 (19 pages, including English translation).
Extended European Search Report corresponding to EP 18767757.0; dated Nov. 16, 2020 (8 pages).
Chinese Office Action corresponding to CN 201880018638.4; dated Apr. 21, 2021 (19 pages, including English translation).

* cited by examiner

FIG. 6A
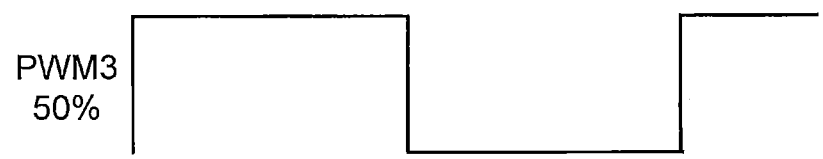
FIG. 6B
FIG. 6C
FIG. 6D

CURRENT SURGE PROTECTION CIRCUITS FOR BASE STATION ANTENNAS HAVING REMOTE ELECTRONIC TILT CAPABILITY AND RELATED METHODS

CROSS REFERENCE TO RELATED APPLICATION

The present application is a 35 U.S.C. § 371 national stage application of PCT International Application Serial No. PCT/US2018/022607, filed on Mar. 15, 2018, which itself claims priority to U.S. Provisional Patent Application Ser. No. 62/472,978, filed Mar. 17, 2017, the entire contents of which are incorporated by reference herein as if set forth in its entirety.

BACKGROUND

The present disclosure relates generally to cellular base station antennas and, more particularly, to cellular base station antennas having remote electronic tilt capabilities.

Base station antennas for wireless communication systems are used to transmit radio frequency ("RF") signals to, and receive RF signals from, fixed and mobile users of a cellular communications service. Base station antennas are directional devices that can concentrate the RF energy that is transmitted in, and received from, certain directions. The "gain" of a base station antenna in a given direction is a measure of the ability of the antenna to concentrate the RF energy in that particular direction. The "radiation pattern" of a base station antenna is compilation of the gain of the antenna across all different directions. The radiation pattern of a base station antenna is typically designed to service a pre-defined coverage area, which refers to a geographic region in which fixed and mobile users can communicate with the cellular network through the base station antenna. The base station antenna may be designed to have gain levels that meet or exceed pre-defined thresholds throughout this pre-defined coverage area. It is typically desirable that the base station antenna also have much lower gain levels outside of the coverage area to reduce interference.

Early base station antennas typically had a fixed radiation pattern, meaning that once a base station antenna was installed, its radiation pattern could not be changed unless a technician physically reconfigured the antenna. Unfortunately, such manual reconfiguration of base station antennas after deployment, which could become necessary due to, for example, changes in typical user locations within the coverage area, changed environmental conditions and/or the installation of additional base stations, was typically difficult, expensive, and time-consuming.

More recently, base station antennas have been deployed that have radiation patterns that can be reconfigured from a remote location. For example, base station antennas have been developed for which settings, such as the down tilt angle, beam width and/or azimuth angle of the antenna can be reconfigured from a remote location by transmitting control signals to the antenna. Base station antennas that can have their down tilt or "elevation" angle changed from a remote location are typically referred to as remote electronic tilt ("RET") antennas. RET antennas allow wireless network operators to remotely adjust the radiation pattern of the antenna through the use of electro-mechanical actuators that may adjust phase shifters or other devices in the antenna to affect the radiation pattern of the antenna. Typically, the radiation pattern of a RET antenna is adjusted using actuators that are controlled via control signal specifications promulgated by the Antenna Interface Standards Group ("AISG").

Base station antennas typically comprise a linear array or a two-dimensional array of radiating elements, such as dipole or crossed dipole radiating elements. To change the down tilt angle of these antennas, a phase taper may be applied across the radiating elements. Such a phase taper may be applied by adjusting the settings on an adjustable phase shifter that is positioned along the RF transmission path between a radio and the individual radiating elements of the base station antenna. One known type of phase shifter is an electromechanical rotating "wiper" arc phase shifter that includes a main printed circuit board and a "wiper" printed circuit board that may be rotated above the main printed circuit board. Such rotating wiper arc phase shifters typically divide an input RF signal that is received at the main printed circuit board into a plurality of sub-components, and then capacitively couple at least some of these sub-components to the wiper printed circuit board. These sub-components of the RF signal may be capacitively coupled from the wiper printed circuit board back to the main printed circuit board along a plurality of arc-shaped traces, where each arc has a different radius. Each end of each arc-shaped trace may be connected to a radiating element or to a sub-group of radiating elements. By physically rotating the wiper printed circuit board above the main printed circuit board, the location where the sub-components of the RF signal capacitively couple back to the main printed circuit board may be changed, thereby changing the path lengths that the sub-components of the RF signal traverse when passing from a radio to the radiating elements. These changes in the path lengths result in changes in the phases of the respective sub-components of the RF signal, and because the arcs have different radii, the change in phase experienced along each path differs. Typically, the phase taper is applied by applying positive phase shifts of various magnitudes (e.g., $+1°$, $+2°$ and $+3°$) to some of the sub-components of the RF signal and by applying negative phase shifts of the same magnitudes (e.g., $-1°$, $-2°$ and $-3°$) to additional of the sub-components of the RF signal. Thus, the above-described rotary wiper arc phase shifters may be used to apply a phase taper to the sub-components of an RF signal that are transmitted through the respective radiating elements (or sub-groups of radiating elements). Exemplary phase shifters of this variety are described in U.S. Pat. No. 7,907,096 to Timofeev, the disclosure of which is hereby incorporated herein by reference in its entirety. The wiper printed circuit board is typically moved using an actuator that includes a direct current ("DC") motor that is connected to the wiper printed circuit board via a mechanical linkage. These actuators are often referred to as RET actuators because they are used to apply the remote electronic down tilt.

SUMMARY

In some embodiments of the inventive concept, a system comprises a remote electronic tilt phase shifter module, a motor, a mechanical linkage that connects the motor to the remote electronic tilt phase shifter module, a current management circuit that generates a motor control signal responsive to a current control signal, and a driver circuit that is configured to selectively connect the motor to a power supply in response to the motor control signal.

In other embodiments, the current control signal is a pulse width modulated signal.

In other embodiments, the motor is a direct current motor and a duty cycle of the pulse width modulated signal is based on a magnitude of current drawn by the direct current motor.

In other embodiments, the duty cycle of the pulse width modulated signal is based on a defined electromagnetic interference (EMI) standard.

In other embodiments, the EMI standard comprises at least one of EN55022, CFR 47 Part 15, CISPR 22, and ICES-003.

In other embodiments, the duty cycle of the pulse width modulated signal monotonically increases until reaching a maximum value.

In other embodiments, the system further comprises an antenna coupled to the remote electronic tilt phase shifter module. The remote electronic tilt phase shifter module is configured to adjust at least one of an elevation angle of the antenna and an azimuth angle of the antenna responsive to movement of the mechanical linkage by the motor.

In other embodiments, the driver circuit is further configured to connect the motor to the power supply when the motor control signal is in a first logic state and to disconnect the direct current motor from the power supply when the motor control signal is in a second logic state.

In other embodiments, the driver circuit comprises an H-bridge circuit comprising a first pair of switches and a second pair of switches. One of the first pair of switches is responsive to the motor control signal when the motor is configured to turn in a first direction and one of the second pair of switches is responsive to the motor control signal when the motor is configured to turn in a second direction.

In some embodiments of the inventive concept, a system comprises a remote electronic tilt phase shifter module, a motor, a mechanical linkage that connects the motor to the remote electronic tilt phase shifter module, a current management circuit that generates a motor control signal responsive to a comparison between a current drawn by the motor and a defined current threshold, and a driver circuit that is configured to selectively connect the motor to a power supply in response to the motor control signal.

In other embodiments, the defined current threshold is based on an environmental temperature.

In other embodiments, the defined current threshold is based on a defined electromagnetic interference (EMI) standard.

In other embodiments, the current management circuit comprises a comparator circuit that is configured to generate a comparison signal at an output thereof responsive to the current drawn by the motor and the defined current threshold.

In other embodiments, the comparator circuit comprises an output circuit that is configured to generate the comparison signal at the output of the comparator circuit, the output circuit comprising an open collector or open drain circuit.

In other embodiments, the current management circuit further comprises a resistor-capacitor network coupled to the output of the comparator circuit.

In other embodiments, the resistor-capacitor network has a first time constant when the comparison signal is in a first logic state and a second time constant when the comparison signal is in a second logic state, the second time constant being different than the first time constant.

In other embodiments, the driver circuit is further configured to connect the motor to the power supply when the motor control signal is in a first logic state and to disconnect the direct current motor from the power supply when the motor control signal is in a second logic state.

In other embodiments, the driver circuit comprises an H-bridge circuit comprising a first pair of switches and a second pair of switches. One of the first pair of switches is responsive to the motor control signal when the motor is configured to turn in a first direction and one of the second pair of switches is responsive to the motor control signal when the motor is configured to turn in a second direction.

It is noted that aspects described with respect to one embodiment may be incorporated in different embodiments although not specifically described relative thereto. That is, all embodiments and/or features of any embodiments can be combined in any way and/or combination. Moreover, other apparatus, methods, systems, and/or articles of manufacture according to embodiments of the inventive subject matter will be or become apparent to one with skill in the art upon review of the following drawings and detailed description. It is intended that all such additional apparatus, systems, methods, and/or articles of manufacture be included within this description, be within the scope of the present inventive subject matter, and be protected by the accompanying claims. It is further intended that all embodiments disclosed herein can be implemented separately or combined in any way and/or combination.

BRIEF DESCRIPTION OF THE DRAWINGS

Other features of embodiments will be more readily understood from the following detailed description of specific embodiments thereof when read in conjunction with the accompanying drawings, in which:

FIGS. 6A, 6B, 6C, and 6D are waveform diagrams of pulse width modulated signals used to drive the start-up circuit component of FIG. 5 in accordance with some embodiments of the inventive concept.

DETAILED DESCRIPTION

In the following detailed description, numerous specific details are set forth to provide a thorough understanding of embodiments of the present disclosure. However, it will be understood by those skilled in the art that the present invention may be practiced without these specific details. In some instances, well-known methods, procedures, components and circuits have not been described in detail so as not to obscure the present disclosure. It is intended that all embodiments disclosed herein can be implemented separately or combined in any way and/or combination. Aspects described with respect to one embodiment may be incorporated in different embodiments although not specifically described relative thereto. That is, all embodiments and/or features of any embodiments can be combined in any way and/or combination.

Figure 1:
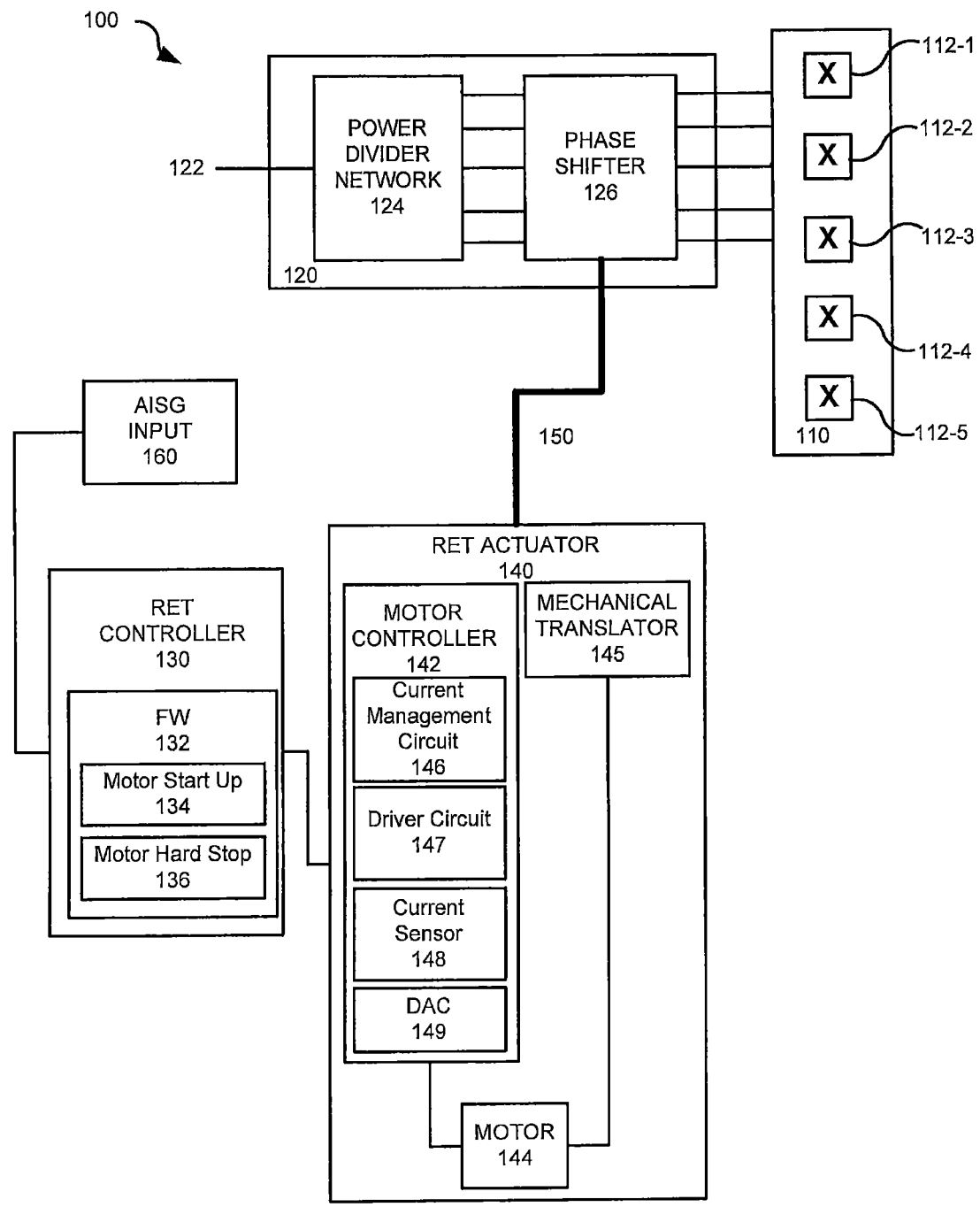
FIG. 1 is a schematic block diagram illustrating a base station antenna system including current surge protection functionality for a remote electronic tilt (RET) motor in accordance with some embodiments of the inventive concept.

FIG. 1 is a schematic block diagram illustrating a base station antenna system including current surge protection functionality for a remote electronic tilt (RET) motor according to some embodiments of the inventive concept. It should be noted that FIG. 1 does not show the actual location of the various elements of the antenna system, but instead shows the connections between the various elements. It will also be appreciated that the connection lines in FIG. 1 represent paths for electrical signals (e.g., RF transmission lines, control signals, etc.). The same approach is taken in the other schematic diagrams described below.

As shown in FIG. 1, the base station antenna system 100 includes a vertical array 110 of radiating elements 112. The vertical array 110 may be fed by a feed network 120. The feed network 120 includes an input 122 and a power divider network 124 that divides an RF signal that is received at the input 122 into a plurality of sub-components. The input 122 of the feed network 120 may be connected to a radio (not shown), such as a remote radio head.

It will be appreciated that for signals received at the vertical array 110, the power divider network 124 may operate as a combiner, combining the sub-components of the RF signal received at each radiating element 112 and providing the combined signal to the radio. Some or all of the sub-component of the RF signal may be phase shifted by a phase shifter 126 that is included in the feed network 120. The phase shifter 126 applies a phase taper to the RF signal sub-components as they are fed to the individual radiating elements 112 in the vertical array 110. Such phase tapers may be used to apply an electronic down tilt to the radiation pattern formed by the vertical array 110. As an example, the first radiating element 112-1 in the linear array 110 may have a phase of Y°+2X°, the second radiating element 112-2 may have a phase of Y°+X°, the third radiating element 112-3 may have a phase of Y°, the fourth radiating element 112-4 may have a phase of Y°−X°, and the fifth radiating element 112-5 may have a phase of Y°−2X°.

In many instances, both the power divider network 124 and the phase shifter 126 for the vertical array 110 may be implemented as a single, electromechanical phase shifter, such as a rotary wiper arc phase shifter. An example of such a phase shifter is shown in FIG. 2.

Figure 2:
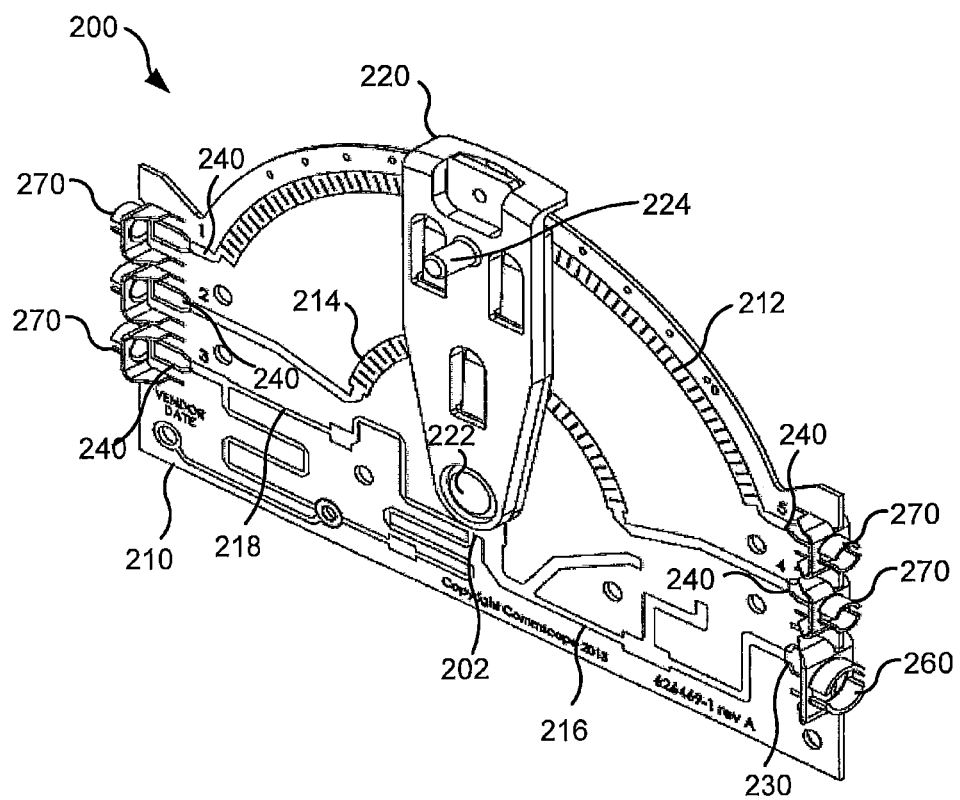
FIG. 2 is a perspective diagram of an electromechanical rotary wiper arc phase shifter that may be used to implement the power divider network and phase shifters of FIG. 1 in accordance with some embodiments of the inventive concept.

Referring now to FIG. 2 an electromechanical rotary wiper arc phase shifter 200 is illustrated that may be used to implement the power divider network 124 and phase shifters 126 of FIG. 1 in accordance with some embodiments of the inventive concept.

As shown in FIG. 2, the phase shifter 200 includes a main (stationary) printed circuit board 210 and a rotatable wiper printed circuit board 220 that is rotatably mounted on the main printed circuit board 210 via a pivot pin 222. The position of the rotatable wiper printed circuit board 220 above the main printed circuit board 210 is controlled by the position of a mechanical linkage 150 of FIG. 1 that may connect, for example, to post 224 on the wiper printed circuit board 220. The other end of the mechanical linkage 150 may be coupled to a RET actuator 140 as shown in FIG. 1.

The main printed circuit board 210 includes a plurality of generally arcuate transmission line traces 212, 214. In some cases the arcuate transmission line traces 212, 214 may be disposed in a serpentine pattern to achieve a longer effective length. In the example illustrated in FIG. 2, there are two arcuate transmission line traces 212, 214, with the first arcuate transmission line trace 212 being disposed along an outer circumference of printed circuit board 210 and the second arcuate transmission line trace 214 is disposed on a shorter radius concentrically within the outer transmission line trace 212. A third transmission line trace 216 on the main printed circuit board 210 connects an input pad 230 on the printed circuit board 210 to a power divider 202. A first output of the power divider 202, which carries the majority of the power of any RF signal input at input pad 230, capacitively couples to a circuit trace (not visible) on the wiper printed circuit board 220. The second output of the power divider 202 connects to an output pad 240 via a transmission line trace 218. RF signals that are coupled to this output pad 240 are not subjected to an adjustable phase shift.

The wiper printed circuit board 220 includes another power divider (not shown as it is on the rear side of wiper printed circuit board 220) that divides the RF signals coupled thereto. One output of this power divider couples to a first pad (not shown) on the wiper printed circuit board 220 that overlies transmission line trace 212, and the other output of this power divider couples to a second pad (not shown) on the wiper printed circuit board 220 that overlies transmission line trace 214. The first and second pads capacitively couple the respective outputs of the power divider on wiper printed circuit board 220 to the respective transmission line traces 212, 214 on the main printed circuit board 210. Each end of each transmission line trace 212, 214 may be coupled to a respective output pad 240. A cable holder 260 may be provided adjacent the input pad 230 to facilitate connecting a coaxial cable or other RF transmission line component to the input pad 230. Respective cable holders 270 may be provided adjacent each of the output pads 240 to facilitate connecting additional coaxial cables or other RF transmission line component to each output pad 240. As the wiper printed circuit board 220 moves, an electrical path length from the input pad 230 of phase shifter 200 to each radiating element 112 changes. For example, as the wiper printed circuit board 220 moves to the left it shortens the electrical length of the path from the input pad 230 to the output pad 240 connected to the left side of transmission line trace 212, while the electrical length from the input pad 230 to the output pad 240 connected to the right side of transmission line trace 212 increases by a corresponding amount. These changes in path lengths result in phase shifts to the signals received at the output pads 240 connected to transmission line trace 212 relative to, for example, the output pad 240 connected to transmission line trace 218. Thus, the phase shifter 200 may receive an RF signal at input pad 230, divide the RF signal into a plurality of sub-components, apply different amounts of phase shift to each sub-component, and output the phase-shifted sub-components on output pads 240.

Returning to FIG. 1, only a single vertical array 110 and associated feed network 120 is shown in FIG. 1 to simplify the drawing. It will be appreciated, that more vertical arrays 110 and feed networks 120 may be provided in accordance with various embodiments of the inventive concept. It will likewise be appreciated that if the radiating elements 112 are implemented as dual polarized radiating elements, such as slant +/−45 degree dipole radiating elements, the number of feed networks 120 may be doubled as the dipoles at each polarization may be fed by a separate feed network 120.

The base station antenna 100 further includes a RET controller 130, a RET actuator 140, and mechanical linkage 150. The base station antenna 100 may further include a control signal input 160, such as an AISG connector that receives external control signals from a remote location. The AISG control signal input 160 typically communicates with the RET controller 130 using an AISG communication protocol over either a dedicated eight-pin cable or over the radio frequency path. AISG is based on the RS485 serial communication bus. In the example of FIG. 1, the external control signal may comprise, for example, an external control signal R1 that is used to physically configure the phase shifter 126. For example, the phase shifter 200 of FIG. 2 may be used to implement the phase shifter 126 and includes a rotatable wiper printed circuit board 220 that is rotatably mounted on the main printed circuit board 210 via a pivot pin 222. The position of the rotatable wiper printed circuit board 220 above the main printed circuit board 210 is controlled by the position of the mechanical linkage 150 that may connect, for example, to post 224 on the wiper printed circuit board 220. The RET controller 130 may include firmware 132 that controls the operation thereof. The RET controller 130 may receive an external control signal (e.g., R1) and generate an internal control signal in response thereto such as, for example, an internal control signal C1 that may be used to drive physical movement of the phase shifter 126. The RET controller 130 may be implemented, for example using a commercially available microcontroller, application specific integrated circuit or the like.

The internal control signal C1 may be transmitted from the RET controller 130 to the RET actuator 140. In FIG. 1, a single RET actuator 140 is shown for a single vertical array 110. It will be appreciated that more RET actuators 140 may be provided in other embodiments. For example, if wideband radiating elements 112 are used that transmit and receive RF signals in multiple frequency bands, then diplexers (not shown) may be provided along the feed path between the phase shifter 126 and the radiating elements 112, and each frequency dependent output of each diplexer may be fed to a different phase shifter 126 so that independent phase shifts may be applied to each frequency band. Additional RET actuators 140 may be provided to adjust these additional phase shifters 126 in such embodiments.

As shown in FIG. 1, each RET actuator 140 may be implemented, for example, as a motor controller 142, a DC motor 144 and one or more mechanical translators 145, such as a worm gear with an internally threaded piston mounted thereon that translates the circular motion applied to the drive shaft of the DC motor 144 into linear motion. Each mechanical translator 145 may be coupled to a mechanical linkage 150. The motor controller 142 may receive the internal control signal C1 from the RET controller 130 and, in response thereto, may activate the DC motor 144. As the drive shaft on the DC motor 144 spins upon activation, the piston that is mounted on the worm gear moves linearly. The mechanical linkage 150 may be connected to the piston and hence the mechanical linkage 150 may move linearly in response to the rotation of the drive shaft of the DC motor 144. For example, another portion (e.g., a far end) of the mechanical linkage 150 may be connected to a moving part (e.g., to post 224 on the wiper printed circuit board 220 of the electromechanical rotary wiper arc phase shifter 200 of FIG. 2) on the electromechanical phase shifter 126 so that movement of the mechanical linkage 150 results in an adjustment of a setting of the phase shifter 126 so that the phase shifter 126 applies more or less phase shift. In this fashion, an external control signal received at the control input 160 may be used to change an electronic down tilt of one of the vertical arrays 110.

Conventionally, DC power is continuously supplied to the DC motor 144 to move the mechanical linkage 150 responsive to the control signal from the RET controller 130. When the motor controller 142 initially activates the DC motor 144 to begin turning, however, the DC motor 144 may draw excess current resulting in a current spike or current surge as compared to the current drawn when the DC motor 144 is turning during steady state operation. This current spike upon start-up may generate electromagnetic interference (EMI) noise that may violate AISG specifications for peak power. In addition, high DC motor 144 torque at start-up may damage mechanical parts, such as the mechanical linkage 150 and/or mechanical components of the phase shifter 126. In addition, similar current spikes or surges may occur when the DC motor 144 is turning or attempting to turn, but the DC motor 144 experiences mechanical interference or excessive mechanical resistance. The excessive mechanical resistance can result from the mechanical linkage 150 operating improperly or being poorly lubricated, the phase shifter components 126, e.g., the wiper printed circuit board 220, not rotating smoothly or being poorly lubricated, external elements, such as ice, snow, dirt, or the like inhibiting movement of the mechanical linkage 150 and/or the phase shifter components 126, a technician manually moving the phase shifter components 126 while the DC motor 144 is running, and/or low temperatures reducing the effectiveness of the lubrication for the mechanical linkage 150 and/or the phase shifter components 126. Some embodiments of the inventive concept may provide current management circuitry that can reduce or mitigate the effects of current spikes generated by the DC motor 144 at start-up and/or resulting from mechanical interference events during steady state operation.

The RET controller 130 comprises firmware 132 that includes a motor start-up module 134 and a motor hard stop module 136. The motor start-up module 134 may be configured to manage the current drawn by the DC motor 144 when the DC motor 144 initially starts operation, i.e., at start-up. The motor hard stop module 136 may be configured to manage the current drawn by the DC motor 144 when the motor is running, but experiences mechanical interference or excess mechanical resistance. The motor start-up module 134 and the motor hard stop module 136 communicate with the motor controller 142 to manage the current spikes or surges that may occur at start-up of the DC motor 144 and when the DC motor 144 experiences mechanical interference or excess mechanical resistance during steady state operation.

In an example embodiment, the motor controller 142 includes a current management circuit 146, a driver circuit 147, a current sensor 148, and a digital-to-analog converter (DAC) 149. The current management circuit 146 may include both a start-up circuit component for managing current spikes or surges at start-up of the DC motor 144 and a cutoff circuit component for managing current spikes or surges resulting from mechanical interference or excess mechanical resistance while the DC motor 144 is running. The driver circuit 147 may include an H-bridge motor driver circuit as shown in FIG. 3.

Figure 3:
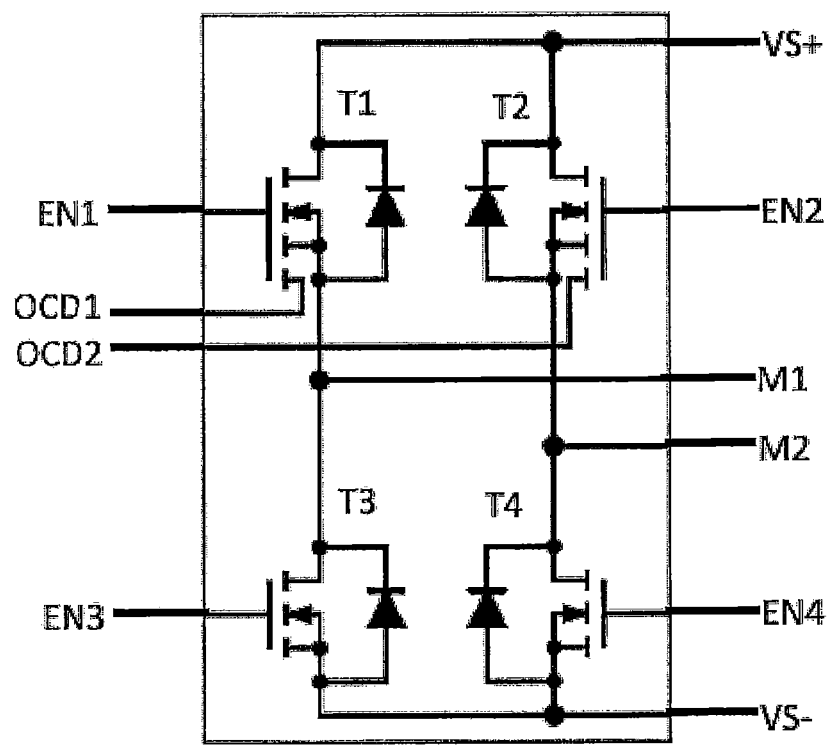
FIGS. 3 and 4 are circuit schematics of a driver circuit for a RET motor in accordance with some embodiments of the inventive concept.
Figure 4:
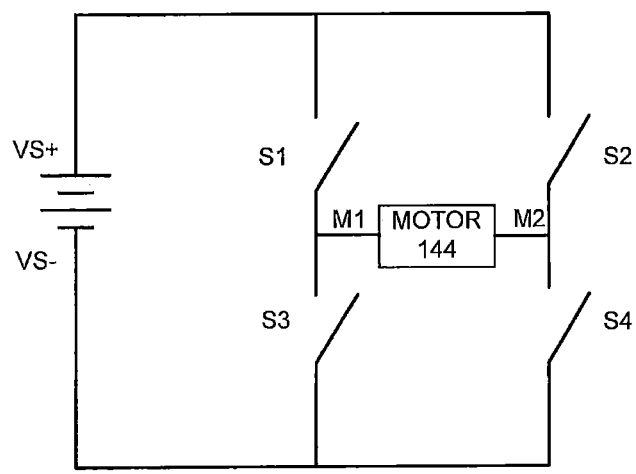

Referring now to FIG. 3, the H-bridge circuit includes four switches each consisting of a MOSFET and diode pair labeled T1, T2, T3, and T4. Each switch receives an enable signal EN1, EN2, EN3, and EN4, respectively, to open or close the switch. Switches T1 and T2 include additional inputs, OCD1 and OCD2, respectively, to disable the switches responsive to overload events. The DC motor 144 may be coupled to nodes M1 and M2 with the circuit being powered by a power supply voltage represented as VS+ and VS−. FIG. 4 is a simplified schematic of the H-bridge circuit of FIG. 3 with switches S1-S4 corresponding to switches T1-T4, respectively, in FIG. 3. When switches S1 and S4 are closed and switches S2 and S3 are open, the DC motor 144 may be motivated to turn in a first direction. Conversely, when switches S1 and S4 are open and switches S2 and S3 are closed, the DC motor 144 may be motivated to turn in a second direction, opposite the first direction. As described above with respect to FIG. 3, the switches S1, S2, S3, and S4 can be open and closed through enable signals EN1, EN2, EN3, and EN4 applied to gate terminals of MOSFET transistors used to implement the switches. These enable signals EN1, EN2, EN3, and EN4 may be generated by the RET controller 130 firmware 132.

Returning to FIG. 1, the current sensor 148 may detect the current drawn by the DC motor 144 and provide a signal to the RET controller 130 firmware 132 that is indicative of the magnitude of the current drawn by the DC motor 144. The DAC 149 may convert digital signals generated by the RET controller 130 into analog signals or voltage levels used by the various modules of the motor controller 142.

Figure 7:
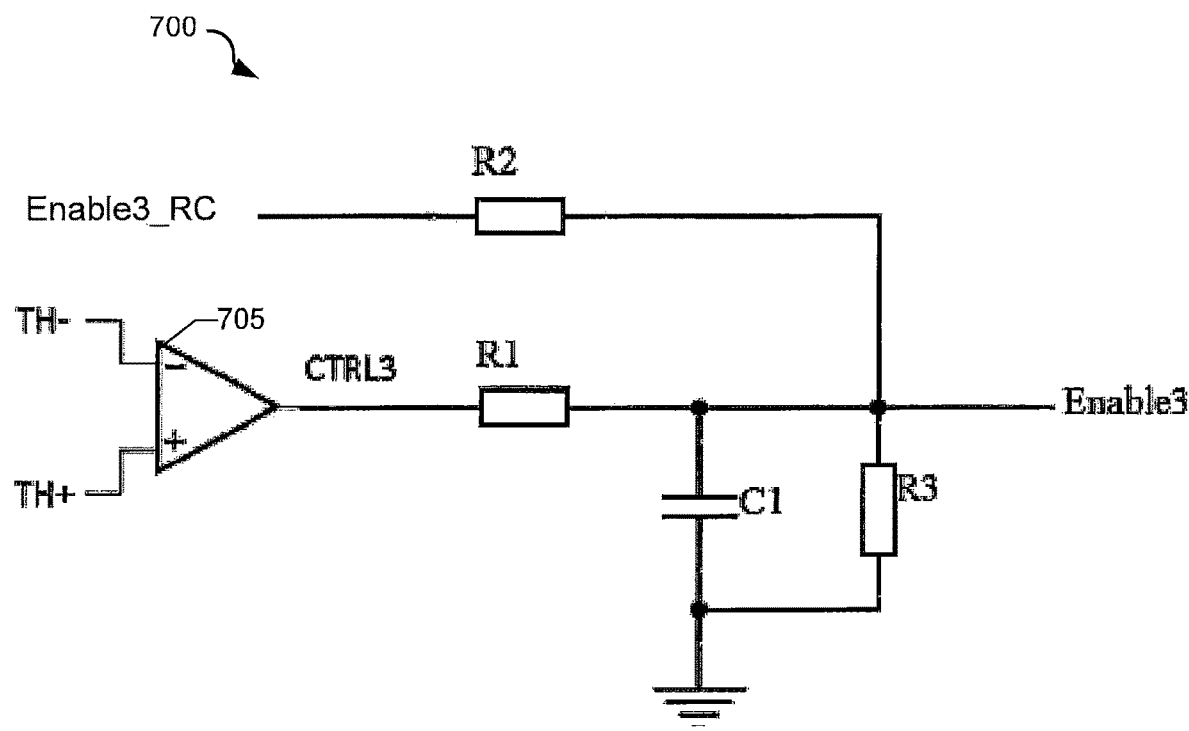
FIG. 7 is a circuit schematic of a cutoff circuit component in accordance with some embodiments of the inventive concept.

Operations of the RET controller 130 and the motor controller 142 for reducing or mitigating the effects of current spikes generated by the DC motor 144 at start-up and/or resulting from mechanical interference events during steady state operation will now be described with reference to FIGS. 5-7. For purposes of illustration, the operations of the RET controller 130 and motor controller 142 are described hereafter with reference to the operation of switch T3 of FIG. 3 or S3 of FIG. 4. It will be understood that the operations are applicable to any of the other switches comprising driver circuit 147. For example, when the switches T1 and T4 are closed to operate the DC motor 144 in a first direction, the operations described herein may be applied to switch T4. When switches T2 and T3 are closed to operate the DC motor 144 in a second direction, the operations described herein may be applied to switch T3.

Figure 5:
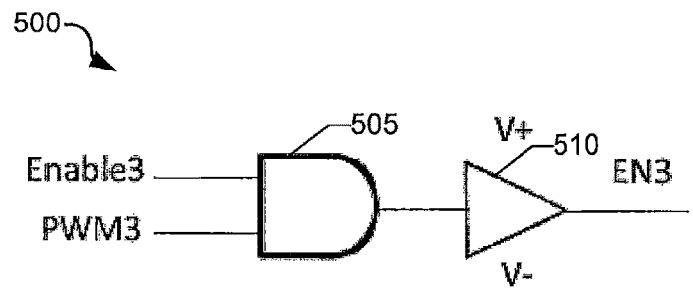
FIG. 5 is a circuit schematic of a start-up circuit component in accordance with some embodiments of the inventive concept.

FIG. 5 is a schematic of a start-up circuit component 500 of the current management circuit 146 for managing current spikes or surges at start-up of the DC motor 144. The start-up circuit component 500 comprises an AND logic gate 505 coupled to a voltage level shifter 510. The AND gate 505 receives two inputs: an Enable3 signal and a pulse width modulation (PWM3) signal, which may represent a current control signal. The Enable3 signal is output from the cutoff circuit component of the current management circuit 146, which will be described with reference to FIG. 7. The Enable3 signal is output at a logic high level when the DC motor 144 is idle and is initially turned on. The PWM3 signal is generated by the motor start-up module 134 of the RET controller 130 based on the magnitude of the current drawn by the DC motor 144, which is received from the current sensor 148. Thus, the voltage level shifter 510 provides a voltage level shifted version of the PWM3 signal at its output as the enable signal EN3 for the switch T3. The enable signal EN3 may represent a motor control signal. With the Enable3 signal at a logic high level, when the PWM3 signal is at a logic high level, then the enable signal EN3 will be driven high to turn the switch T3 on thereby applying the power supply voltage to the DC motor 144 to cause the DC motor 144 to start turning. When the PWM3 signal is at a logic low level, then the enable signal EN3 will be driven low to turn the switch T3 off thereby removing the power supply voltage from the DC motor 144. The motor start-up module 134 may adjust the duty cycle of the PWM3 signal based on the amount of current being drawn by the DC motor 144. As shown in FIG. 6A through FIG. 6D, at start-up the DC motor 144 may draw larger amounts of current to get the motor turning. As a result, the motor start-up module 134 may set the duty cycle of the PWM3 signal to 25% as shown in FIG. 6A, such that the DC motor 144 is electrically connected to the power supply only 25% of the time. The duty cycle percentage is the percentage of time the signal PWM3 is at a logic high level over a full period T of the signal. The motor start-up module 134 may continue to monitor the current drawn from the DC motor 144 based on the feedback from the current sensor 148 and over time increase the duty cycle to 50% as shown in FIG. 6B to 75% as shown in FIG. 6C and to 100% as shown in FIG. 6D. It will be understood that these steps of increasing the duty cycle of the PWM3 signal from 25% to 100% in equal stair-step 25% increments are for purposes of illustration only. In accordance with various embodiments of the inventive concept, the motor start-up module 134 may increase the duty cycle of the PWM3 signal in various ways to ensure that the current being drawn by the DC motor 144 does not exceed a threshold that may create undesired EMI noise and/or may violate proscribed EMI standards, such as those proscribed in the following EMI standards: EN55022 (EU), CFR 47 Part 15 (USA), CISPR 22 (AUS and NZ), and ICES-003 (Canada). Thus, the amount of time that the PWM3 signal is assigned a particular duty cycle and the increments made when adjusting the duty cycle may vary based on the current drawn by the DC motor 144. For example, in some embodiments, the duty cycle of the PWM3 signal may monotonically increase over time until reaching a final steady state operating value while the DC motor 144 is running. The values of the PWM3 duty cycle over time may be monotonically increasing, may have both increasing and decreasing segments, may be represented by a linear function, may be represented by a non-linear function, may be represented by an exponential function, may be represented by a logarithmic function, may be represented as a stair-step function, and the like in accordance with various embodiments of the inventive concept. When the DC motor 144 is running at full speed and operating at steady state, the PWM3 signal may be set to a constant logic high level, i.e., a 100% duty cycle as shown in FIG. 6D or, alternatively, as high of a duty cycle as can be used without the DC motor 144 drawing more than a desired current level. This threshold of a desired current level can be set and used by the motor start-up module 134 as a basis for determining the highest duty cycle for the PWM3 signal. Thus, the start-up circuit component 500 may reduce or mitigate the effect of noise causing current spikes when the DC motor 144 is initially activated and draws excess current to get the DC motor 144 initially turning.

As described above, once the DC motor 144 is turning, it may nevertheless experience current spikes or surges similar to those experienced at start-up due to mechanical interference or excessive mechanical resistance in the mechanical linkage 150 and/or the phase shifter 126. FIG. 7 is a schematic of a cutoff circuit component 700 of the current management circuit 146 for managing current spikes or surges from the DC motor 144 resulting from mechanical interference or excessive mechanical resistance once the DC motor 144 is turning. The cutoff circuit component 700 comprises a comparator circuit 705 that generates a signal CTRL3 at its output in response to two inputs signals: TH− and TH+. A resistor R1 is coupled between the output of the comparator circuit 705 and an output node corresponding to the signal Enable3. The Enable3 signal is provided as one of the inputs to the start-up circuit component 500 described with reference to FIG. 5. A capacitor C1 and resistor R3 are coupled in parallel between the output node and ground and a resistor R2 is coupled between the output node and an input node for receiving the signal Enable3_RC from the RET controller 130. The TH− input signal is received from the current sensor module 148 and is representative of the current being drawn by the DC motor 144. The TH+ input signal is received from the motor hard stop module 136 and represents an upper current threshold level for the DC motor 144. The upper current threshold value may be set based on environmental conditions or load conditions, for example. In lower temperatures or when driving higher loads, the upper current threshold value may be set to a higher value as it is expected that the DC motor 144 would draw more current under these conditions even in normal operation. The motor hard stop module 136 may, therefore, receive data from a temperature sensor to be used as a factor in setting the upper current threshold level for the DC motor 144. The upper current threshold may also be set based on EMI noise specifications set by, for example, one or more of the following EMI standards: EN55022 (EU), CFR 47 Part 15 (USA), CISPR 22 (AUS and NZ), and ICES-003 (Canada). The Enable3_RC signal is provided by motor hard stop module 136 and is set to a logic high value unless the motor hard stop module 136 determines that the DC motor 144 should be turned off as will be described below. During normal operation, the average current supplied to the DC motor 144 is less than the upper current threshold and the comparator circuit 705 outputs the CTRL3 signal at a logic high level. The comparator circuit 705 may, in some embodiments, be implemented using an open collector/open drain output circuit stage in which a pull-up transistor is used between a logic high voltage source and the collector or drain. Such an embodiment exhibits high output impedance when in a logic high state and low output impedance in a logic low state. Due to the high output impedance of the comparator circuit 705 when the CTRL3 signal is at a logic high level, the capacitor C1 is charged through the resistor R2 using the Enable3_RC signal. The resistor R3 may be about 10 times larger than the resistor R2 so that there is a small voltage drop across the resistor R2 and the output signal Enable3 is output at a logic high level. The values for R2 and C1 can be set to create a desired time delay in driving the Enable3 signal to a logic high level based on the RC time constant. The time delay may be used to reduce the risk of oscillation when reconnecting the power supply to the DC motor 144 after the power supply to the DC motor 144 has been disconnected.

During an event when the DC motor 144 experiences a current surge or spike due to mechanical interference or excessive mechanical resistance in the mechanical linkage 150 and/or the phase shifter 126, the DC motor 144 current exceeds the upper current threshold and the comparator circuit 705 drives the CTRL3 signal to a low logic level. The output impedance of the comparator circuit 705 when in a logic low state may be low and the resistor R1 may have a relatively low impedance of around a few hundred ohms. The capacitor C1 may have a capacitance of a few nanofarads, which may allow the capacitor C1 to discharge quickly due to the relatively low time constant created by the capacitor C1 and the resistor R1. As a result, the output signal Enable3 may be driven to a logic low level to disconnect the DC motor 144 from the power supply.

In particular embodiments of the inventive concept, the resistor R1 may have a resistance value in a range from about 100 ohms to about 1K ohms, the resistor R2 may have a resistance value in a range from about 2.5K ohms to about 3.5K ohms, the resistor R3 may have a resistance value in a range from about 25K ohms to about 35K ohms, and the capacitor C1 may have a capacitance in a range from about 2 nF to about 10 nF.

Thus, the cutoff circuit component 700 of the current management circuit 146 may provide hardware-based functionality to disconnect the DC motor 144 from the power supply quickly in response to current spikes or surges when the DC motor 144 is running Because some type of mechanical interference may be permanently constricting the movement of the mechanical linkage 150 and/or phase shifter 126, for example, the motor hard stop module 136 may include a timer such that if the DC motor 144 is unable to be driven without a current surge event for a defined time interval, then the DC motor 144 may be presumed to be in a blocked state and the motor hard stop module 136 may drive the Enable3_RC to a logic low level to disconnect the DC motor 144 from the power supply. In other embodiments, if the number of current surge events exceeds a defined threshold in a defined time interval, then the DC motor 144 may be presumed to be in a blocked state and the motor hard stop module 136 may drive the Enable3_RC to a logic low level to disconnect the DC motor 144 from the power supply. When the DC motor 144 is presumed to be in a blocked state, the motor hard stop module 136 may generate a notification or alert to inform a technician that the RET system is in need of maintenance. This notification or alert may be passed to the base station and transmitted to the appropriate destination.

It will be understood that although the start-up circuit component 500 of the current management circuit 146 and the cutoff circuit component 700 of the current management circuit 146 are shown as operating in cooperation with one another with the Enable3 output from the cutoff circuit component 700 being an input to the start-up circuit component 500, the two circuits can be used independent of one another with the Enable3 output signal of the cutoff circuit component 700 serving as the EN3 activation signal for the third switch T3 of the driver circuit 147. Thus, the Enable3 output signal may represent a motor control signal similar to the EN3 signal output from the start-up circuit component 500.

Some embodiments of the inventive concept may provide current surge protection circuits for base station antennas that have an RET capability. In some embodiments, a start-up circuit component and a cutoff circuit component may be provided to address current surges that result when the motor is initially started up and surges that occur when the motor is running, but experiences some type of mechanical interference, respectively. The cutoff circuit component may be implemented via hardware circuits that can quickly disconnect the motor from the power supply when a current surge is detected so as to avoid potential damage to the running motor and/or damage to mechanical components in the RET system. Under normal conditions, the start-up circuit component may maintain the current drawn by the motor when first starting up to an acceptably low level to comply with EMI noise standards and reduce stress on mechanical components. When the motor experiences high loads while running due to low temperatures, mechanical interference, excessive mechanical resistance, poorly lubricated parts, and the like, the cutoff circuit component may quickly disconnect the motor from the power supply to ensure that the peak current drawn by the motor does not exceed a predefined magnitude. This may allow the RET system to comply with any EMI standards as well as reduce or avoid damage to the motor itself and/or mechanical components. Moreover, by "cutting off" the current to the motor using a PWM power supply control signal (and varying the duty cycle thereof), the RET system may remain fully functional while complying with EMI standards.

Further Definitions and Embodiments

In the above-description of various embodiments of the present disclosure, aspects of the present disclosure may be illustrated and described herein in any of a number of patentable classes or contexts including any new and useful process, machine, manufacture, or composition of matter, or any new and useful improvement thereof. Accordingly, aspects of the present disclosure may be implemented entirely hardware, entirely software (including firmware, resident software, micro-code, etc.) or combining software and hardware implementation that may all generally be referred to herein as a "circuit," "module," "component," or "system." Furthermore, aspects of the present disclosure may take the form of a computer program product comprising one or more computer readable media having computer readable program code embodied thereon.

Any combination of one or more computer readable media may be used. The computer readable media may be a computer readable signal medium or a computer readable storage medium. A computer readable storage medium may be, for example, but not limited to, an electronic, magnetic, optical, electromagnetic, or semiconductor system, apparatus, or device, or any suitable combination of the foregoing. More specific examples (a non-exhaustive list) of the computer readable storage medium would include the following: a portable computer diskette, a hard disk, a random access memory (RAM), a read-only memory (ROM), an erasable programmable read-only memory (EPROM or Flash memory), an appropriate optical fiber with a repeater, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device. Program code embodied on a computer readable signal medium may be transmitted using any appropriate medium, including but not limited to wireless, wireline, optical fiber cable, RF, etc., or any suitable combination of the foregoing.

Aspects of the present disclosure are described herein with reference to flowchart illustrations and/or block diagrams of methods, apparatus (systems), and computer program products according to embodiments of the disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable instruction execution apparatus, create a mechanism for implementing the functions/acts specified in the flowchart and/or block diagram block or blocks.

These computer program instructions may also be stored in a computer readable medium that when executed can direct a computer, other programmable data processing apparatus, or other devices to function in a particular manner, such that the instructions when stored in the computer readable medium produce an article of manufacture including instructions which when executed, cause a computer to implement the function/act specified in the flowchart and/or block diagram block or blocks. The computer program instructions may also be loaded onto a computer, other programmable instruction execution apparatus, or other devices to cause a series of operational steps to be performed on the computer, other programmable apparatuses or other devices to produce a computer implemented process such that the instructions which execute on the computer or other programmable apparatus provide processes for implementing the functions/acts specified in the flowchart and/or block diagram block or blocks.

The flowchart and block diagrams in the figures illustrate the architecture, functionality, and operation of possible implementations of systems, methods, and computer program products according to various aspects of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular aspects only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items. Like reference numbers signify like elements throughout the description of the figures.

Terms such as "top," "bottom," "upper," "lower," "above," "below," and the like are used herein to describe the relative positions of elements or features. For example, when an upper part of a drawing is referred to as a "top" and a lower part of a drawing is referred to as a "bottom" for the sake of convenience, in practice, the "top" may also be called a "bottom" and the "bottom" may also be a "top" without departing from the teachings of the inventive concept.

Furthermore, throughout this disclosure, directional terms such as "upper," "intermediate," "lower," and the like may be used herein to describe the relationship of one element or feature with another, and the inventive concept should not be limited by these terms. Accordingly, these terms such as "upper," "intermediate," "lower," and the like may be replaced by other terms such as "first," "second," "third," and the like to describe the elements and features.

It will be understood that, although the terms "first," "second," etc. may be used herein to describe various elements, these elements should not be limited by these terms. These terms are only used to distinguish one element from another. Thus, a first element could be termed a second element without departing from the teachings of the inventive concept.

The terminology used herein to describe embodiments of the invention is not intended to limit the scope of the inventive concept.

Unless otherwise defined, all terms (including technical and scientific terms) used herein have the same meaning as commonly understood by one of ordinary skill in the art to which this inventive concept belongs. It will be further understood that terms, such as those defined in commonly used dictionaries, should be interpreted as having a meaning that is consistent with their meaning in the context of the relevant art and this specification and will not be interpreted in an idealized or overly formal sense unless expressly so defined herein.

The description of the present disclosure has been presented for purposes of illustration and description, but is not intended to be exhaustive or limited to the disclosure in the form disclosed. Many modifications and variations will be apparent to those of ordinary skill in the art without departing from the scope and spirit of the disclosure. The aspects of the disclosure herein were chosen and described in order to best explain the principles of the disclosure and the practical application, and to enable others of ordinary skill in the art to understand the disclosure with various modifications as are suited to the particular use contemplated.

What is claimed is:

1. A system, comprising:
   a remote electronic tilt phase shifter module;
   a motor;
   a mechanical linkage that connects the motor to the remote electronic tilt phase shifter module;
   a current management circuit that generates a motor control signal responsive to a current control signal; and
   a driver circuit that is configured to selectively connect the motor to a power supply in response to the motor control signal.

2. The system of claim 1, wherein the current control signal is a pulse width modulated signal.

3. The system of claim 2, wherein the motor is a direct current motor; and
   wherein a duty cycle of the pulse width modulated signal is based on a magnitude of current drawn by the direct current motor.

4. The system of claim 3, wherein the duty cycle of the pulse width modulated signal is based on a defined electromagnetic interference (EMI) standard.

5. The system of claim 4, wherein the EMI standard comprises at least one of EN55022, CFR 47 Part 15, CISPR 22, and ICES-003.

6. The system of claim 3, wherein the duty cycle of the pulse width modulated signal monotonically increases until reaching a maximum value.

7. The system of claim 1, wherein the system further comprises:
   an antenna coupled to the remote electronic tilt phase shifter module;
   wherein the remote electronic tilt phase shifter module is configured to adjust at least one of an elevation angle of the antenna and an azimuth angle of the antenna responsive to movement of the mechanical linkage by the motor.

8. The system of claim 1, wherein the driver circuit is further configured to connect the motor to the power supply when the motor control signal is in a first logic state and to disconnect the direct current motor from the power supply when the motor control signal is in a second logic state.

9. The system of claim 1, wherein the driver circuit comprises an H-bridge circuit comprising a first pair of switches and a second pair of switches;
   wherein one of the first pair of switches is responsive to the motor control signal when the motor is configured to turn in a first direction and one of the second pair of switches is responsive to the motor control signal when the motor is configured to turn in a second direction.

10. The system of claim 1, wherein the driver circuit comprises an H-bridge circuit comprising a first pair of switches and a second pair of switches;
    wherein one of the first pair of switches is responsive to the motor control signal when the motor is configured to turn in a first direction and one of the second pair of switches is responsive to the motor control signal when the motor is configured to turn in a second direction.

11. A system, comprising:
    a remote electronic tilt phase shifter module;
    a motor;
    a mechanical linkage that connects the motor to the remote electronic tilt phase shifter module;
    a current management circuit that generates a motor control signal responsive to a comparison between a current drawn by the motor and a defined current threshold; and
    a driver circuit that is configured to selectively connect the motor to a power supply in response to the motor control signal.

12. The system of claim 11, wherein the defined current threshold is based on an environmental temperature.

13. The system of claim 11, wherein the defined current threshold is based on a defined electromagnetic interference (EMI) standard.

14. The system of claim 13, wherein the EMI standard comprises at least one of EN55022, CFR 47 Part 15, CISPR 22, and ICES-003.

15. The system of claim 11, wherein the current management circuit comprises a comparator circuit that is configured to generate a comparison signal at an output thereof responsive to the current drawn by the motor and the defined current threshold.

16. The system of claim 15, wherein the comparator circuit comprises an output circuit that is configured to generate the comparison signal at the output of the comparator circuit, the output circuit comprising an open collector or open drain circuit.

17. The system of claim 15, wherein the current management circuit further comprises a resistor-capacitor network coupled to the output of the comparator circuit.

18. The system of claim 17, wherein the resistor-capacitor network has a first time constant when the comparison signal is in a first logic state and a second time constant when the comparison signal is in a second logic state, the second time constant being different than the first time constant.

19. The system of claim 11, wherein the system further comprises:
   an antenna coupled to the remote electronic tilt phase shifter module;
   wherein the remote electronic tilt phase shifter module is configured to adjust at least one of an elevation angle of the antenna and an azimuth angle of the antenna responsive to movement of the mechanical linkage by the motor.

20. The system of claim 11, wherein the driver circuit is further configured to connect the motor to the power supply when the motor control signal is in a first logic state and to disconnect the direct current motor from the power supply when the motor control signal is in a second logic state.

* * * * *